(12) United States Patent
Park (10) Patent No.: US 9,709,751 B2
(45) Date of Patent: Jul. 18, 2017

(54) OPTICAL FIBER CONNECTOR REINFORCED FOR PREVENTING LIGHT LOSS

(71) Applicant: ILSIN OTS CO., LTD., Daejeon (KR)

(72) Inventor: Chan Soul Park, Daejeon (KR)

(73) Assignee: ILSIN OTS CO., LTD., Daejeon (KR)

( * ) Notice: Subject to any disclaimer, the term of this patent is extended or adjusted under 35 U.S.C. 154(b) by 0 days.

(21) Appl. No.: 14/895,232

(22) PCT Filed: Jan. 21, 2014

(86) PCT No.: PCT/KR2014/000588
§ 371 (c)(1),
(2) Date: Dec. 2, 2015

(87) PCT Pub. No.: WO2014/171617
PCT Pub. Date: Oct. 23, 2014

(65) Prior Publication Data
US 2016/0147022 A1    May 26, 2016

(30) Foreign Application Priority Data

Apr. 18, 2013  (KR) .................. 10-2013-0042587

(51) Int. Cl.
*G02B 6/36* (2006.01)
*G02B 6/38* (2006.01)

(52) U.S. Cl.
CPC ......... *G02B 6/3821* (2013.01); *G02B 6/3874* (2013.01); *G02B 6/3887* (2013.01); *G02B 6/3825* (2013.01)

(58) Field of Classification Search
None
See application file for complete search history.

(56) References Cited

U.S. PATENT DOCUMENTS 6,796,721 B2 * 9/2004 Matsumoto .......... G02B 6/3887
385/56
9,069,140 B2 * 6/2015 Park .................... G02B 6/3846
(Continued)

FOREIGN PATENT DOCUMENTS

CN        1550806 A    12/2004
KR  10-1997-0048661 A    7/1997
(Continued)

OTHER PUBLICATIONS

International Search Report for PCT/KR2014/000588 mailed May 30, 2014.

*Primary Examiner* — Rhonda Peace
(74) *Attorney, Agent, or Firm* — STIP Law Group, LLC (57) ABSTRACT

Disclosed is an optical connector fastened to an adapter which is reinforced by securing a buffering space to make the optical connector moveable so as not to generate a light loss even when receiving an external force so that the optical connector is not easily detached from the adapter compared to a conventional one. The optical fiber connector includes: a boot with a connection hole for supporting the optical fiber; and a ferrule part connected to the connection hole of the boot for resiliently supporting a ferrule connected to the optical fiber, the ferrule part being separated from the boot when receiving an external force, wherein the ferrule part is provided with a protuberance for fastening to the connection hole of the boot, and the protuberance is formed smaller than the length of the inner peripheral surface of the connection hole so as to be moved in the connection hole.

4 Claims, 9 Drawing Sheets

(56) References Cited

U.S. PATENT DOCUMENTS

| 2012/0288238 | A1 | | 11/2012 | Park | |
|---|---|---|---|---|---|
| 2013/0156382 | A1 | * | 6/2013 | Park | G02B 6/3846 |
| | | | | | 385/78 |
| 2016/0147022 | A1 | * | 5/2016 | Park | G02B 6/3887 |
| | | | | | 385/78 |

FOREIGN PATENT DOCUMENTS

| KR | 10-2000-0074785 A | 12/2000 |
|---|---|---|
| KR | 10-2002-0002288 A | 1/2002 |
| KR | 10-1203509 B1 | 11/2012 |

* cited by examiner

BEFORE PULLING

AFTER PULLING

OPTICAL FIBER CONNECTOR REINFORCED FOR PREVENTING LIGHT LOSS

CROSS-REFERENCE TO RELATED APPLICATIONS

This application is the U.S. National Phase under 35 U.S.C. §371 of International Application No. PCT/KR2014/000588 filed on Jan. 21, 2014, which in turn claims the benefit of Korean Application No. 10-2013-0042587, filed on Apr. 18, 2013, the disclosures of which are incorporated by reference into the present application.

TECHNICAL FIELD

This embodiments relate to an optical fiber connector, and more particularly to an optical fiber connector which includes a buffer allowance to make the optical fiber connector movable enough to incur no optical loss rate even though an external force is applied to the optical fiber connector coupled to an adaptor, so that the optical fiber connector is not easily separated from the adaptor as compared with a conventional optical fiber connector.

BACKGROUND ART

A Fiber To The Home (FTTH) system which connects optical cables to homes and provides various information including broadcast and communication has been recently proposed. The FTTH system is being applied and installed in apartments, houses, etc.

The optical cable of the FTTH system is, for example, connected even within homes. The end of the optical cable is finished in the form of an optical fiber connector and installed. Here, an FTTH worker sets a length of the optical cable to be several meters longer than an actually measured length in consideration of the connection between the optical cables, and introduces the optical cable into homes. Then, the worker cuts the optical cable to have a required length within homes, i.e., a construction site, assembles the optical fiber connector to the end of the optical cable, and connects this to an optical adaptor. As a result, the optical cable is installed within homes.

An example of the optical fiber connector is disclosed in Korean Registered Patent Publication No. 10-1203509 (title: optical fiber connector).

Figure 1:
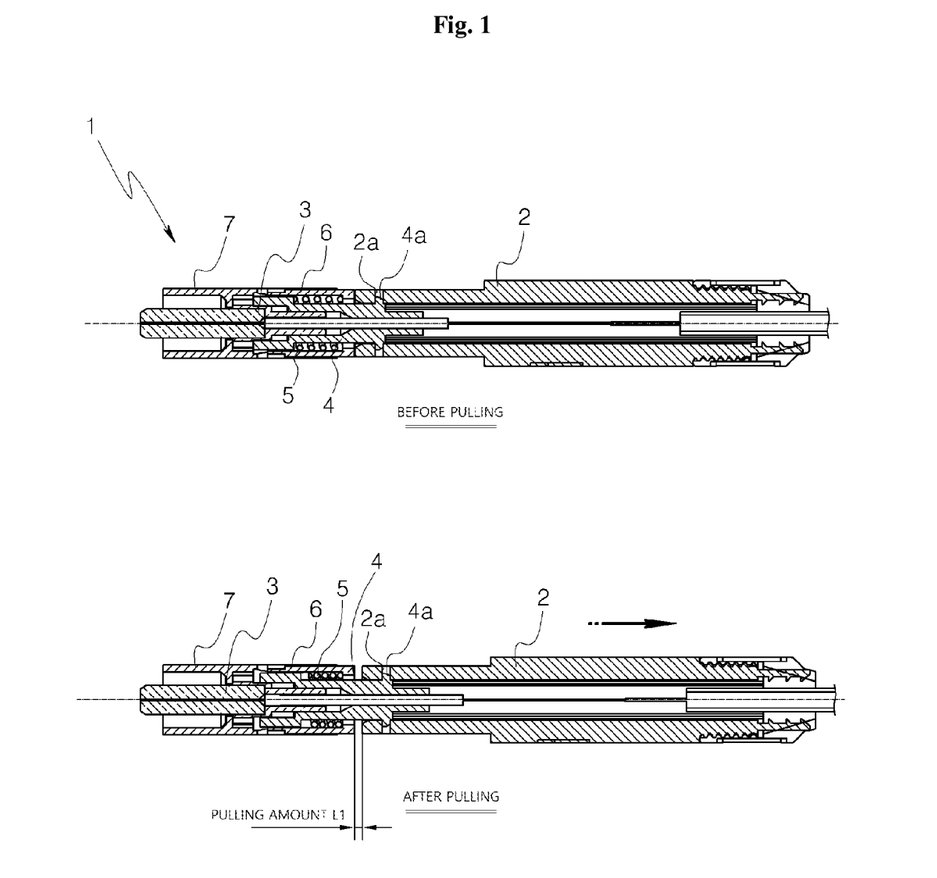
FIG. 1 is a view showing a conventional optical fiber connector and an operation relation thereof.

The detailed configuration of the example of the optical fiber connector is shown in FIG. 1. As shown in FIG. 1, the optical fiber connector 1 fusion-splices a ferrule optical fiber received in a ferrule 3 supported elastically by an elastic member 5 to a main optical fiber by using a fusion-splicer, and reinforces the fusion-splicer by means of a reinforcing sleeve, so that the main optical fiber and the ferrule optical fiber are connected to each other.

In the optical fiber connector 1, a protruding coupling protrusion 4a is formed on the circumference of the optical fiber connector, and a ferrule bush 4 of which an end is coupled to the reinforcing sleeve at the time of reinforcing the fusion-splicer is installed between the ferrule 3 and the elastic member 5.

A boot 2 is installed on the outside of the reinforcing sleeve and has a coupling grove 2a formed in the outer circumferential surface of thereof. The coupling protrusion 4a of the ferrule bush 4 is inserted into the inside of the boot 2 and mounted in the coupling groove 2a, so that the boot 2 is connected to the ferrule bush 4 on the spot.

Attention should be paid to this optical fiber connector in that the length of the coupling groove 2a of the boot 2 is the same as the thickness of the coupling protrusion 4a. This directly affects a phenomenon in which the ferrule 3 tends to be separated from the optical adaptor when an external force is applied (in a direction of an arrow of FIG. 1) to the optical fiber connector connected to the optical adaptor.

PRIOR ART DOCUMENT

Patent Document (Patent Document 1)
1. Korean Registered Patent Publication No. 10-1038195 (Publication Date of Registration: Jun. 1, 2011)
(Patent Document 2)
2. Korean Registered Patent Publication No. 10-1203509 (Publication Date of Registration: Nov. 21, 2012)

DISCLOSURE

Technical Problem

The present invention relates to an optical fiber connector. The object of the present invention is to provide an optical fiber connector which includes a buffer allowance to make the optical fiber connector movable enough to incur no optical loss rate even though an external force is applied to the optical fiber connector coupled to an adaptor, so that the optical fiber connector is not easily separated from the adaptor as compared with a conventional optical fiber connector. As a result, stability can be improved.

Technical Solution

In an optical fiber connector including a boot which supports the optical fiber and has a coupling hole formed therein, and a ferrule part which supports elastically a ferrule connected to the optical fiber, is connected to the coupling hole of the boot, and becomes spaced from the boot when an external force is applied, The ferrule part includes a protrusion to be coupled to the coupling hole of the boot, and the protrusion is formed smaller than a length of an inner circumferential surface of the coupling hole in such a manner as to be movable within the coupling hole.

The optical fiber connector includes a buffer allowance to make the optical fiber connector movable enough to incur no optical loss rate even though an external force is applied to the optical fiber connector coupled to an adaptor, so that the optical fiber connector is not easily separated from the adaptor as compared with a conventional optical fiber connector.

In an optical fiber connector including a boot which supports the optical fiber and has a coupling hole formed therein, and a ferrule part which supports elastically a ferrule connected to the optical fiber, is connected to the coupling hole of the boot, and becomes spaced from the boot when an external force is applied, the ferrule part includes a protrusion to be coupled to the coupling hole of the boot, and the protrusion is formed smaller than a length of an inner circumferential surface of the coupling hole in such a manner as to be movable within the coupling hole, so that a buffer allowance can be obtained.

Here, the ferrule part includes a ferrule bush, a spring, and a stop ring. The ferrule bush surrounds the ferrule having a ferrule optical fiber connected to the optical fiber and has a stepped portion formed around the circumference thereof. The spring is received on the outer circumferential surface of the ferrule bush and has an end supported by the stepped portion. The stop ring surrounds the spring and the ferrule bush, supports the other end of the spring, and has the protrusion formed on the surface thereof. When an external force is applied to the optical fiber, a distance that the protrusion of the stop ring is able to move within the coupling hole and a tension range of the spring act as a distance that the ferrule part or the boot is able to move.

Also, the ferrule part includes a ferrule bush, a spring, and a stop ring. The ferrule bush surrounds the ferrule having a ferrule optical fiber connected to the optical fiber, has a stepped portion formed around the circumference thereof, and has the protrusion formed on the surface thereof. The spring is received on the outer circumferential surface of the ferrule bush and has an end supported by the stepped portion. The stop ring surrounds the spring and the ferrule bush and supports the other end of the spring. When an external force is applied to the optical fiber, a distance that the protrusion of the ferrule bush is able to move within the coupling hole and a tension range of the spring act as a distance that the ferrule part or the boot is able to move.

Also, the ferrule part includes a ferrule frame, a spring, and a stop ring. The ferrule frame is integrally formed with the ferrule having a ferrule optical fiber connected to the optical fiber, has a stepped portion formed around the circumference thereof, and has the protrusion formed on the surface thereof. The spring is received on the outer circumferential surface of the ferrule frame and has an end supported by the stepped portion. The stop ring surrounds the spring and the ferrule frame and supports the other end of the spring. When an external force is applied to the optical fiber, a distance that the protrusion of the ferrule frame is able to move within the coupling hole and a tension range of the spring act as a distance that the ferrule part or the boot is able to move.

Advantageous Effects

According to the embodiment of the present invention, since the optical fiber connector includes a buffer allowance to make the optical fiber connector movable enough to incur no optical loss rate even though an external force is applied to the optical fiber connector coupled to an adaptor, the optical fiber connector is not easily separated from the adaptor as compared with a conventional optical fiber connector. As a result, stability can be improved.

MODE FOR INVENTION

Hereafter, the embodiments of the present invention will be described in detail with reference to the accompanying drawings.

Figure 2:
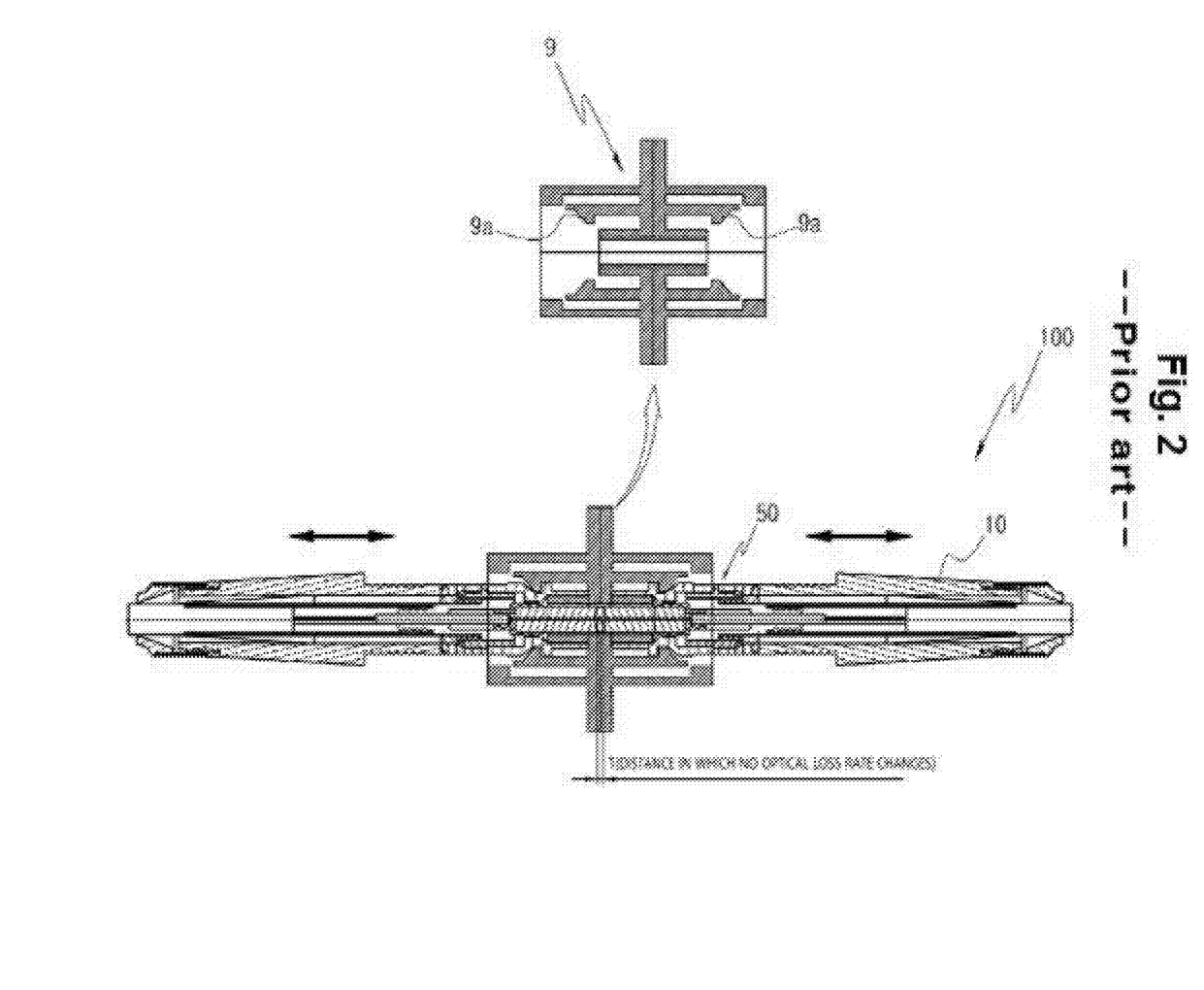
FIG. 2 is a view showing an optical fiber connector mounted in an optical adaptor in accordance with the embodiment of the present invention.

FIG. 2 shows that an optical fiber connector 100 according to the embodiment of the present invention has been coupled to an adaptor 9. The adaptor 9 has a hook 9a formed therein to be coupled to the optical fiber connector 100. The optical fiber connector 100 includes an inside housing 92 (see FIG. 5) to be coupled to the hook 9a. Therefore, the hook 9a and the inside housing 92 are coupled to each other, so that the optical fiber connector 100 is fixed to the adaptor 9.

Figure 3:
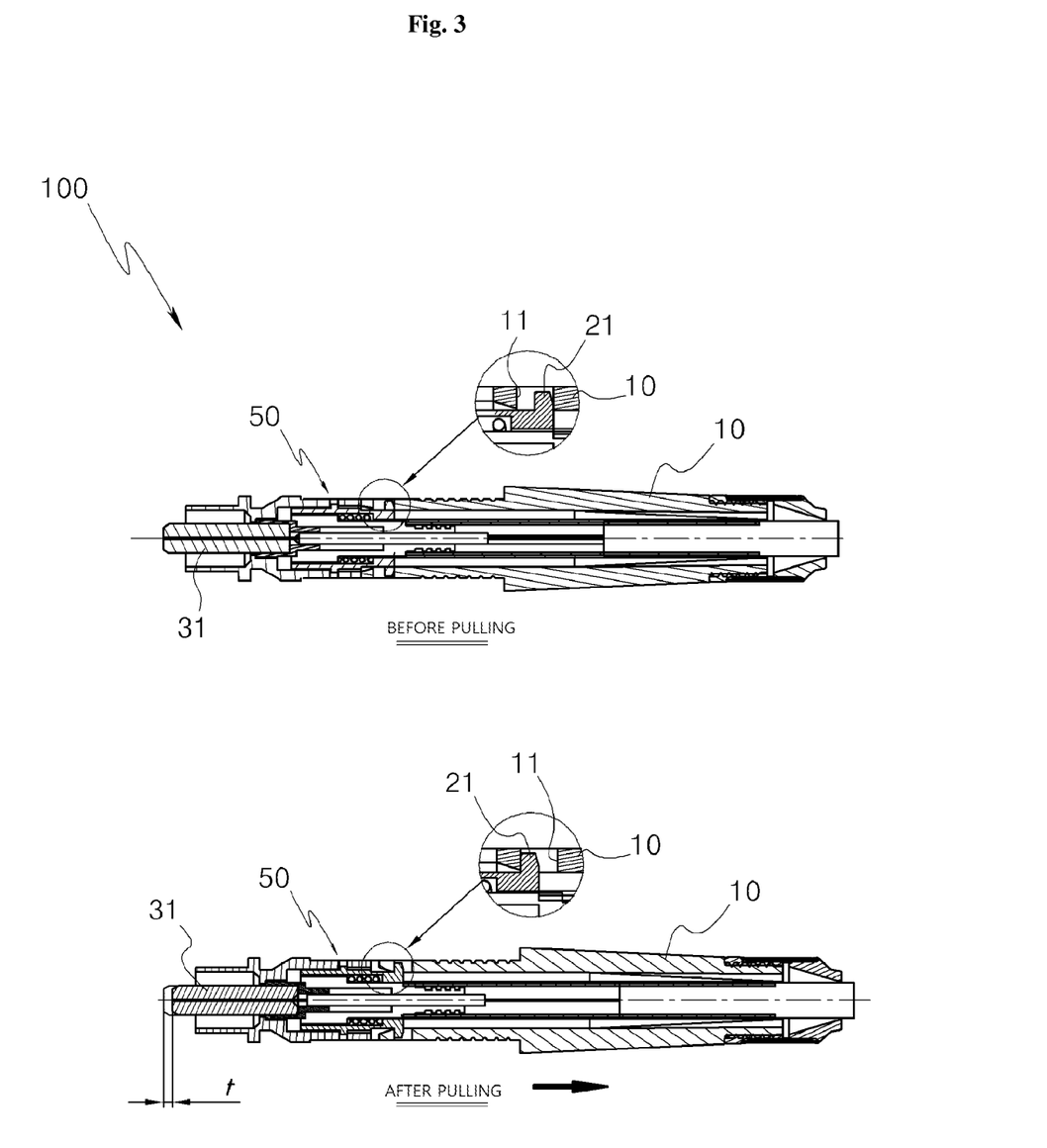
FIG. 3 is a view showing an operation relation of the optical fiber connector shown in FIG. 2.

Referring to FIGS. 2 and 3, even when a ferrule 31 is moved as much as "T" of FIG. 2 by an external force in a state where the optical fiber connector 100 is fixed to the adaptor 9, optical loss does not occur. In the present specification, the "T" is defined as a distance in which no optical loss rate changes.

When an external force is applied to a conventional optical fiber connector 1 shown in FIG. 1, a ferrule 3 is directly affected. In the embodiment of the present invention, as shown in FIG. 3, a coupling hole 11 of a boot 10 is formed in a long shape in a direction in which an external force is applied, and a protrusion 21 of a ferrule part 50, which is designed to be spaced from the boot 10, is formed smaller than the coupling hole 11. Therefore, it is designed such that, when an external force is applied to the optical fiber, the protrusion 21 is movable within the coupling hole 11.

A distance that the protrusion 21 is able to move within the coupling hole 11 may be determined within a range of an error in setting the distance "T" in which no optical loss rate changes.

That is, since the coupling hole 11 and the protrusion 21 are designed in consideration of the distance "T" in which no optical loss rate changes, the optical fiber connector 100 according to the embodiment of the present invention includes a buffer allowance compared with a conventional optical fiber connector, thereby enhancing the stability of the optical fiber connector.

Figure 4:
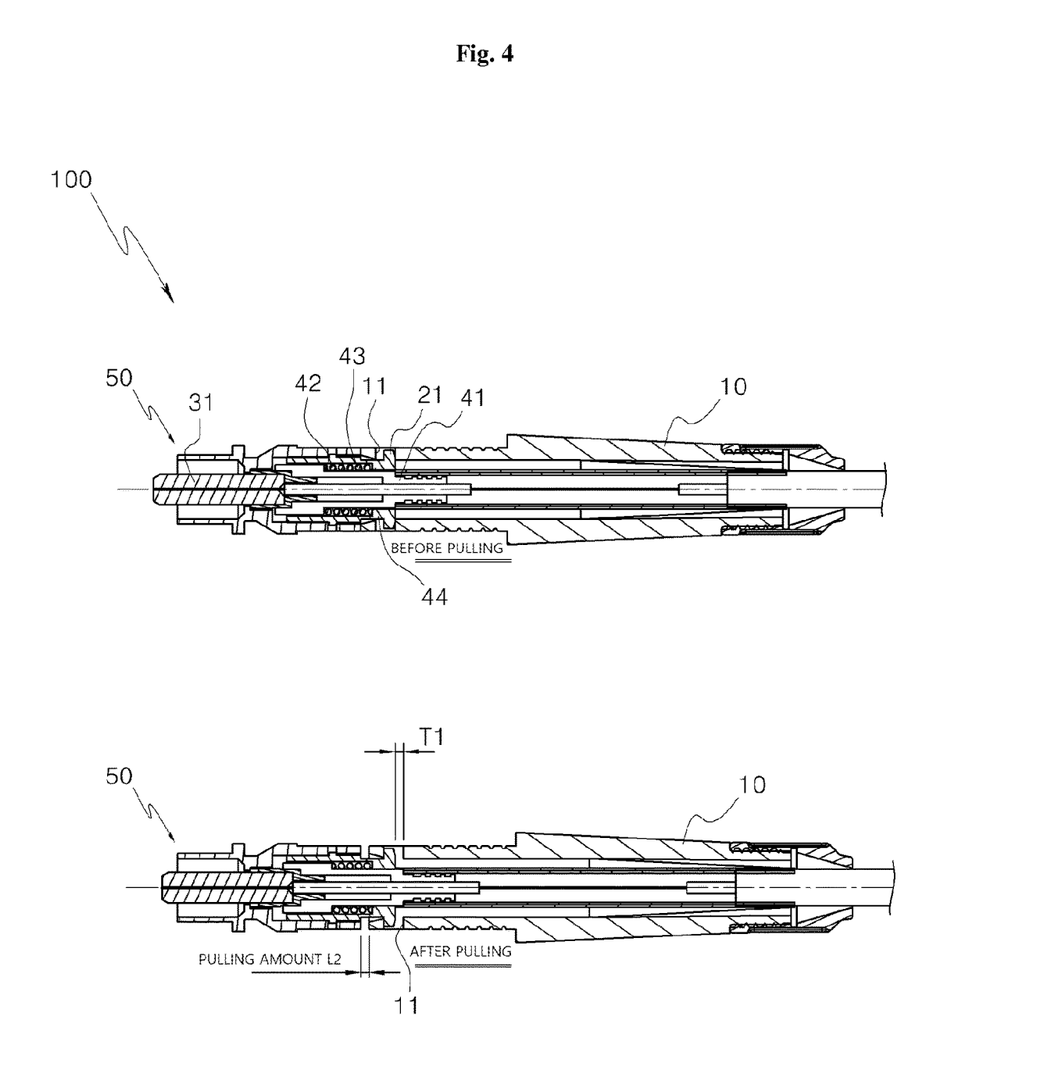
FIGS. 4 to 9 are views showing various embodiments of the optical fiber connector according to the embodiment of the present invention.
Figure 6:
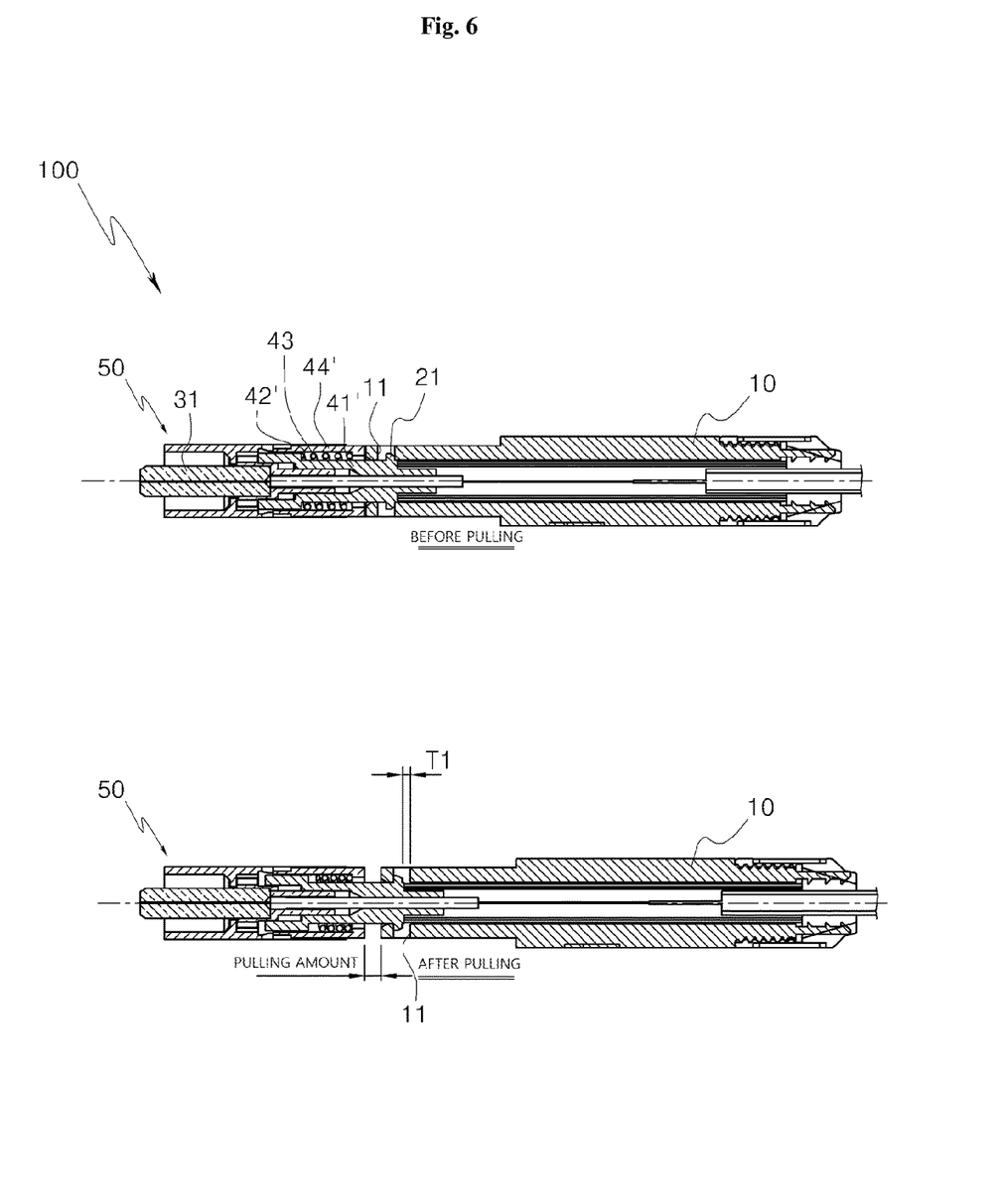
Figure 8:
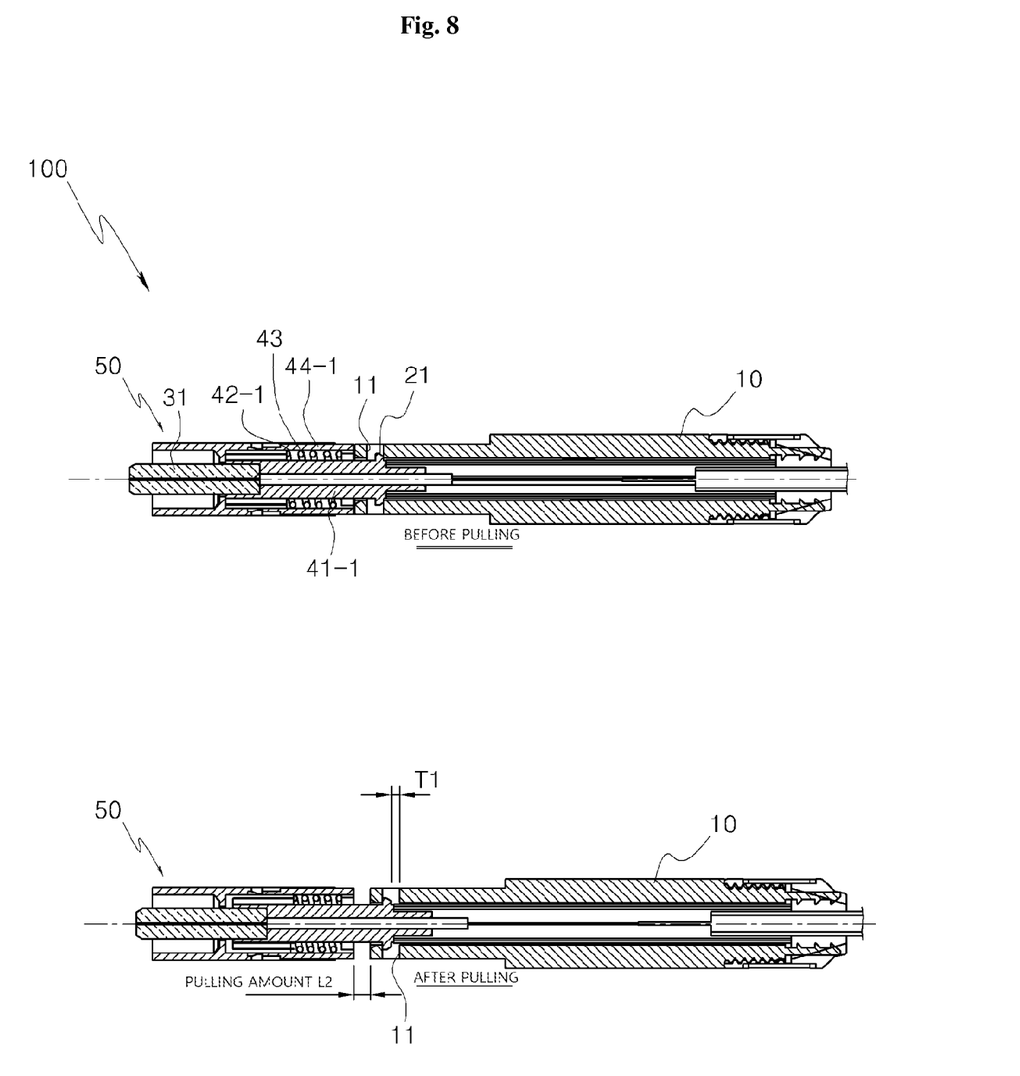

Specifically, the optical fiber connector 100 according to the embodiment of the present invention may be configured as shown in FIGS. 4, 6, and 8 respectively.

The boots 10 of the optical fiber connectors 100 shown in FIGS. 4, 6, and 8 clamp and support the optical fiber, and have the coupling hole 11 formed therein. The configurations of the optical fiber connectors the same as or similar to each other.

Therefore, embodiments of the ferrule part 50 will be described below.

The ferrule part 50 of FIG. 4 includes a ferrule bush 41, a spring 43, and a stop ring 44. The ferrule bush 41 surrounds the ferrule 31 having a ferrule optical fiber connected to the optical fiber and has a stepped portion 42 formed around the circumference thereof. The spring 43 is received on the outer circumferential surface of the ferrule bush 41 and has an end supported by the stepped portion 42. The stop ring 44 surrounds the spring 43 and the ferrule bush 41, supports the other end of the spring 43, and has the protrusion 21 formed on the surface thereof.

In the optical fiber connector 100, when an external force is applied to the optical fiber, a distance "T1" that the protrusion 21 of the stop ring 44 is able to move within the coupling hole 11 and a tension range of the spring 43 act as a distance "L2" that the ferrule part 50 or the boot 10 is able to move.

In other words, when an external force is applied, the protrusion 21 formed on the stop ring 44 moves within the coupling hole 11 of the boot 10 before the ferrule part 50 of FIG. 4 becomes spaced from the boot 10. It is desirable that the distance "T1" that the protrusion 21 has moved should be the distance "T" in which no optical loss rate changes.

The ferrule part 50 of FIG. 6 includes a ferrule bush 41', a spring 43, and a stop ring 44'. The ferrule bush 41' surrounds the ferrule 31 having a ferrule optical fiber connected to the optical fiber, has a stepped portion 42' formed around the circumference thereof, and has the protrusion 21 formed on the surface thereof. The spring 43 is received on the outer circumferential surface of the ferrule bush 41' and has an end supported by the stepped portion 42'. The stop ring 44' surrounds the spring 43 and the ferrule bush 41' and supports the other end of the spring 43.

In the optical fiber connector 100, when an external force is applied to the optical fiber, a distance "T1" that the protrusion 21 of the ferrule bush 41' is able to move within the coupling hole 11 and a tension range of the spring 43 act as a distance "L2" that the ferrule part 50 or the boot 10 is able to move.

In other words, when an external force is applied, the protrusion 21 formed on the ferrule bush 41' moves within the coupling hole 11 of the boot 10 before the ferrule part 50 of FIG. 6 becomes spaced from the boot 10. It is desirable that the distance "T1" that the protrusion 21 has moved should be the distance "T" in which no optical loss rate changes.

The ferrule part 50 of FIG. 8 includes a ferrule frame 41-1, a spring 43, and a stop ring 44-1. The ferrule frame 41-1 is integrally formed with the ferrule 31 having a ferrule optical fiber connected to the optical fiber, has a stepped portion 42-1 formed around the circumference thereof, and has the protrusion 21 formed on the surface thereof. The spring 43 is received on the outer circumferential surface of the ferrule frame 41-1 and has an end supported by the stepped portion 42-1. The stop ring 44-1 surrounds the spring 43 and the ferrule frame 41-1 and supports the other end of the spring 43.

In the optical fiber connector 100, when an external force is applied to the optical fiber, a distance "T1" that the protrusion 21 of the ferrule frame 41-1 is able to move within the coupling hole 11 and a tension range of the spring 43 act as a distance "L2" that the ferrule part 50 or the boot 10 is able to move.

In other words, when an external force is applied, the protrusion 21 formed on the ferrule frame 41-1 moves within the coupling hole 11 of the boot 10 before the ferrule part 50 of FIG. 8 becomes spaced from the boot 10. It is desirable that the distance "T1" that the protrusion 21 has moved should be the distance "T" in which no optical loss rate changes.

Figure 5:
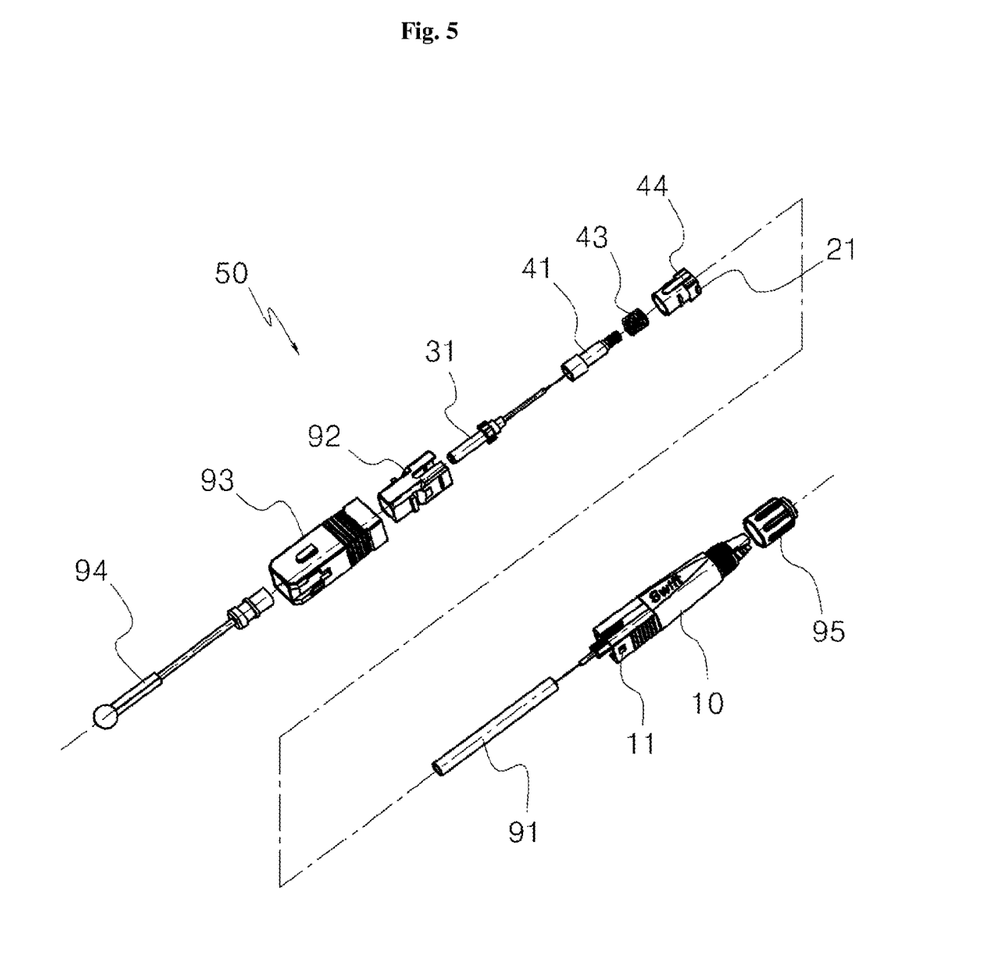
Figure 7:
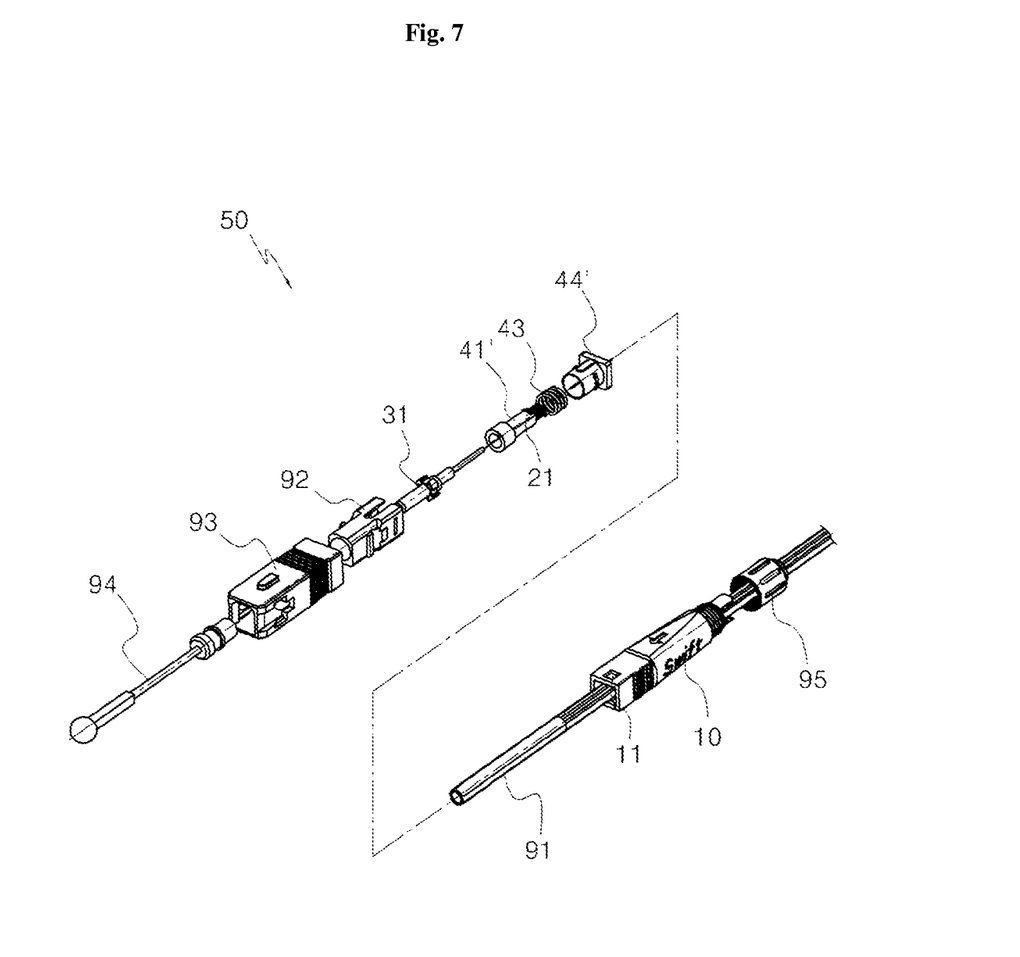
Figure 9:
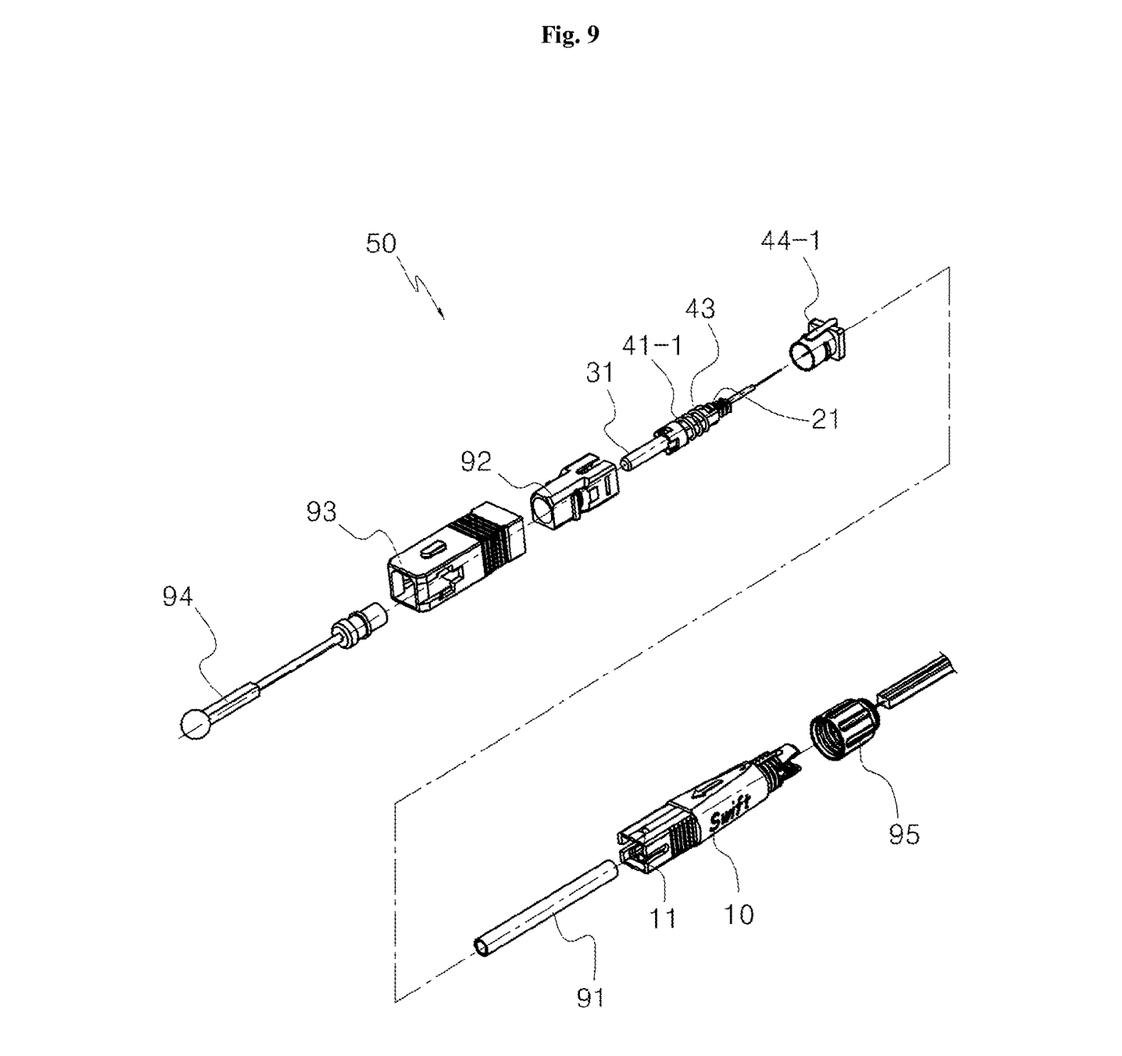

FIGS. 5, 7, and 9 are exploded perspective views of FIGS. 4, 6, and 8 respectively. An undescribed reference numeral 91 is a sleeve tube for reinforcing at the time of connecting the ferrule optical fiber with the optical fiber. The reference numeral 92 is the inside housing to be coupled to the adaptor 9. The reference numeral 93 is an outside housing. The reference numeral 94 is a ferrule cap. The reference numeral 95 is a clamping cap for fixing the optical fiber to the boot 10.

While the exemplary embodiments of the present invention has been described, various changes and modifications of the embodiments can be easily made without departing from the essential features of the present invention by those skilled in the art. Therefore, the disclosed embodiments are merely exemplary and are not to be construed as limiting the present invention. The true scope of the present invention is shown in the appended claims and not in the foregoing descriptions. It should be construed that all differences within the scope equivalent to that of the claims are included in the present invention.

The invention claimed is:

1. An optical fiber connector reinforced for preventing optical loss, the optical fiber connector comprising:
   a boot which supports an optical fiber and has a coupling hole formed therein, and
   a ferrule part which supports elastically a ferrule connected to the optical fiber, the ferrule being connected to the coupling hole of the boot and becoming spaced from the boot when an external force is applied,
   wherein the ferrule part comprises a protrusion to be coupled to the coupling hole of the boot, and wherein the protrusion is formed smaller than a length of an inner circumferential surface of the coupling hole in such a manner as to be movable within the coupling hole.

2. The optical fiber connector of claim 1, wherein the ferrule part comprises a ferrule bush, a spring, and a stop ring,
   wherein the ferrule bush surrounds the ferrule having a ferrule optical fiber connected to the optical fiber and has a stepped portion formed around the circumference thereof,
   wherein the spring is received on the outer circumferential surface of the ferrule bush and has an end supported by the stepped portion,
   wherein the stop ring surrounds the spring and the ferrule bush, supports the other end of the spring, and has the protrusion formed on the surface thereof,
   wherein, when an external force is applied to the optical fiber, a distance "T1" that the protrusion of the stop ring is able to move within the coupling hole and a tension range of the spring act as a distance "L2" that the ferrule part or the boot is able to move.

3. The optical fiber connector of claim 1, wherein the ferrule part comprises a ferrule bush, a spring, and a stop ring,
   wherein the ferrule bush surrounds the ferrule having a ferrule optical fiber connected to the optical fiber, has a stepped portion formed around the circumference thereof, and has the protrusion formed on the surface thereof,
   wherein the spring is received on the outer circumferential surface of the ferrule bush and has an end supported by the stepped portion,
   wherein the stop ring surrounds the spring and the ferrule bush and supports the other end of the spring,
   wherein, when an external force is applied to the optical fiber, a distance "T1" that the protrusion of the ferrule bush is able to move within the coupling hole and a tension range of the spring act as a distance "L2" that the ferrule part or the boot is able to move.

4. The optical fiber connector of claim 1, wherein the ferrule part comprises a ferrule frame, a spring, and a stop ring,
   wherein the ferrule frame is integrally formed with the ferrule having a ferrule optical fiber connected to the optical fiber, has a stepped portion formed around the circumference thereof, and has the protrusion formed on the surface thereof,
   wherein the spring is received on the outer circumferential surface of the ferrule frame and has an end supported by the stepped portion,
   wherein the stop ring surrounds the spring and the ferrule frame and supports the other end of the spring, wherein, when an external force is applied to the optical fiber, a distance "T1" that the protrusion of the ferrule frame is able to move within the coupling hole and a tension range of the spring act as a distance "L2" that the ferrule part or the boot is able to move.

* * * * *